United States Patent Office.

THEODORE A. BARRY AND BENJAMIN ADAMS PATTEN, OF SAN FRANCISCO, CALIFORNIA.

Letters Patent No. 75,837, dated March 24, 1868.

IMPROVED MEDICAL PREPARATION.

*The Schedule referred to in these Letters Patent and making part of the same.*

TO ALL WHOM IT MAY CONCERN:

Be it known that we, THEODORE A. BARRY and BENJAMIN A. PATTEN, of the city and county of San Francisco, State of California, have invented an Improved Tonic called "The Excellent;" and we do hereby declare that the ingredients used in making said tonic, and the process of mixing and compounding them to make it with the best apparatus known to us for the purpose, are described in the following specification.

In the preparation of our tonic, we employ the following ingredients, to wit: Three-fourths ($\frac{3}{4}$) of an ounce of peppermint-leaves; three-fourths ($\frac{3}{4}$) of an ounce of balm-leaves; three-fourths ($\frac{3}{4}$) of an ounce of sage-leaves; one-half ($\frac{1}{2}$) of an ounce of rosemary-leaves; one (1) ounce of scordinum-leaves; one-fourth ($\frac{1}{4}$) of an ounce of blessed thistle; one-half ($\frac{1}{2}$) of a pound of juniper-berries; one-half ($\frac{1}{2}$) of a pound of chamomile flowers; two (2) ounces of anise-seed; two (2) ounces of cubebs; two (2) ounces of galengal-root; two (2) ounces of cardamom-seed; one (1) ounce of cloves; one (1) ounce of cinnamon; one (1) one ounce of ginger-root; one (1) ounce of nutmegs; two (2) ounces of dog-grass.

The herbs should all be cut into pieces about an inch long, and the seeds and spices bruised, after which we put them into an alembic, and add two and one-half ($2\frac{1}{2}$) gallons of brandy, and the same quantity of cold water. The whole is then allowed to infuse or macerate for about twelve (12) hours, after which a gentle fire is placed under the still, and the steam raised and condensed until two (2) gallons of the fluid are withdrawn from the head, which should be kept in a vessel by itself.

In a pan of sufficient capacity we now place two (2) pounds of fine sugar, and one (1) ounce of cochineal, and draw from the alembic one (1) gallon more of the fluid into the vessel containing the sugar and cochineal, when the two gallons, above-described, and the last gallon drawn from the head of the alembic, are mixed together, by shaking well, when it is prepared for bottling and use.

In the distillation of our tonic, a common worm-still, or retort might be used, and perhaps with as good success.

A small wineglassful at one time may be considered sufficient for an adult, yet a much greater quantity will do no harm, as the tendency of our tonic is to stimulate an even circulation through the entire system, and create a gentle action upon the cuticle, which is a great desideratum in the climate of the Pacific coast.

Having thus described our invention, what we claim, and desire to secure by Letters Patent, is—

A tonic made of the ingredients herein enumerated, mixed and compounded together in about the proportions herein described.

In witness whereof, we have hereunto set our hands and seals.

THEODORE A. BARRY. [L. S.]
BEN. ADAMS PATTEN. [L. S.]

Witnesses:
   WM. B. MINTURN,
   JOHN F. WILLIAMS.